United States Patent

Bournas et al.

[11] Patent Number: 5,163,154
[45] Date of Patent: Nov. 10, 1992

[54] MICROCONTROLLER FOR THE RAPID EXECUTION OF A LARGE NUMBER OF OPERATIONS WHICH CAN BE BROKEN DOWN INTO SEQUENCES OF OPERATIONS OF THE SAME KIND

[75] Inventors: Jean-Pierre Bournas, Chaville, France; Jean-Jacques Quisquater; Dominique De Waleffe, both of Bruxelles, Belgium; Peter Klapproth, Hamburg, Fed. Rep. of Germany

[73] Assignee: U.S. Philips Corp., New York, N.Y.

[21] Appl. No.: 631,596

[22] Filed: Dec. 21, 1990

[30] Foreign Application Priority Data

Dec. 29, 1989 [FR] France ................. 89 17455

[51] Int. Cl.⁵ ................. G06F 9/00; G06F 13/00; G06F 7/38; G06F 7/52
[52] U.S. Cl. ................. 395/775; 364/736; 364/748; 364/228.6; 364/231.9; 364/239; 364/239.4; 364/262.1; 364/926.3; 364/931.249; 364/933.2; 364/933.3; 364/946.8
[58] Field of Search ................. 364/736, 745; 395/775

[56] References Cited

U.S. PATENT DOCUMENTS

| 4,525,776 | 7/1985 | Eldumiati et al. ................. 364/200 |
| 4,608,634 | 8/1986 | Caudel et al. ................. 364/200 |
| 4,698,753 | 10/1987 | Hubbins et al. ................. 364/200 |
| 4,740,894 | 4/1988 | Lyon ................. 364/200 |
| 4,760,545 | 7/1988 | Inagami et al. ................. 364/200 |
| 4,773,006 | 9/1988 | Kinoshita et al. ................. 364/200 |
| 4,839,845 | 6/1989 | Rusterholz et al. ................. 364/736 |
| 4,920,508 | 4/1990 | Yassaie et al. ................. 364/736 |
| 4,945,506 | 7/1990 | Baji et al. ................. 364/736 |
| 5,025,407 | 6/1991 | Gulley et al. ................. 364/754 |

FOREIGN PATENT DOCUMENTS

| 0287115 | 10/1988 | European Pat. Off. . |
| 0294487 | 12/1988 | European Pat. Off. . |
| 0320041 | 6/1989 | European Pat. Off. . |
| 2613861 | 10/1988 | France . |

Primary Examiner—Dale M. Shaw
Assistant Examiner—Robert S. Hauser
Attorney, Agent, or Firm—Jack D. Slobod

[57] ABSTRACT

Microcontroller comprising in particular a central processing unit (10), a set of memories (11, 12), a specialized processing module (13) for performing, in sequence, operations on v variable operands and k operands of parameter type (constant during the sequence), and an arrangement of internal buses (20, 21) for the exchange of addresses and data. The microcontroller further has a local bus (25) reserved for the transfer of data between the processing module (13) and the working memory (12), a data switching multiplexer (26) enabling the selection of data either on the local bus (25) or on the internal data bus (21), to be applied to the data port (121) of the working memory (12), as well as, interposed between the internal address bus (20) and the address port (120) of the working memory (12), an address switching multiplexer (28) and a set of pointer registers (31 to 44) of which at least a portion is arranged as queues: v queues (31-41, 32-42) for the v operands plus one queue (34, 44) for the partial results of an operation.

16 Claims, 3 Drawing Sheets

MICROCONTROLLER FOR THE RAPID EXECUTION OF A LARGE NUMBER OF OPERATIONS WHICH CAN BE BROKEN DOWN INTO SEQUENCES OF OPERATIONS OF THE SAME KIND

BACKGROUND OF THE INVENTION

1. Field of the Invention

The present invention relates to an integrated circuit microcontroller for the rapid execution of a large number of operations which can be broken down into successive sequences of operations of the same kind, which includes a specialized processing module for executing sequences of such operations on a plurality of variable and parameter operands applied to its inputs.

2. Description of the Related Art

In general, it is relatively easy to rapidly process a large number of data by means of a computer when no restrictions are imposed on the power of the computer.

Current developments in the data processing field relate to small-sized systems making the greatest possible use of devices integrating multiple and relatively complex functions. A significant example, in the field of miniaturized and portable processing devices, is represented by smart cards or "chip cards", capable of multiple applications, for example: exchange of banking data, access control, signature authentication and the like.

Generally, a smart card functions by means of a single integrated semiconductor microcontroller which alone provides the functions of program management, of storage, of the processing of data entered at the inputs of the card, and of the transmission on its outputs of the processed data.

When the data processing to be performed comprises a large number of similar operations, which can in particular be broken down into sequences of operations of the same kind, on operands with a reduced format (8 bits wide for example), it is advantageous to provide, beside the central processing unit which is on the whole reserved for overall management tasks, a specialized processing module, of the hard-wired logic type, capable of performing at high speed a certain type of arithmetic and/or logic to the central processing unit, at least during the duration of a sequence of operations or series of successive elementary processing cycles. Therefore, an operation is either a single elementary arithmetic calculation, like addition, subtraction, multiplication, and the like, or a logic operation like bitwise AND, OR, XOR, or the like, or still further, a combination of the former expressions taken together but still being of a limited number, such as 2-4, but not limited thereto, and always being executed in the same sequential order. "Of the same kind" means that the values of the operands may differ between successive operations, but the expressions on which the operations are based remain the same during a given sequence. Various problems relating to competitive access to shared memory have been described in EP-A 320 041 to Alcatel and Bell Telephone. This prior art reference does not specifically describe details of the specialized processing module and of the adaptation thereof to the multi-sequential nature of the processing therein.

Since the microcontroller is intended to be incorporated in a smart card, the greatest care is taken in reconciling the low capacity of memories imposed for technical reasons of integration and cost, the clock speed which is also limited by currently achievable technology, and the necessarily reduced format (for example 8 or 16 bits) of the data processed per operation, with the speed of execution of the processing. In practice, the overall duration of the processing must not exceed a limit in the order of 1 second to represent an acceptable waiting time for the user in an interaction process.

Thus, the microcontroller must be arranged in such a way as to produce the greatest possible processing efficiency despite the severe imitations of the means used, and more precisely the size of the semiconductor area available.

Further, FR-A-2613861 in its functioning has stoppage times for the specialized processing module, particularly for the reloading by the central processing unit of new data to be processed, and also stoppage times for the central processing unit when access to the working memory is required by the processing module which deprives the central processing unit of access to the internal address and data buses. These stoppage times result in a very significant slowing down of the known microcontroller.

SUMMARY OF THE INVENTION

Among other things, an object of the invention is to provide a microcontroller whose structure enables, by means of a greater independence between the central processing unit and processing module, minimizing the stoppage times of each and thereby considerably increasing the speed of the processing.

In fact, according to the invention, a microcontroller is characterized in that the bus arrangement comprises, in addition to a first data bus associated with the central processing unit, a specialized local bus reserved for the transfer of data between the processing module and the data port by means of the working memory, in that the said local bus and the first data bus each access the said data port by means of the working memory via a data switching multiplexer, and in that the address port means of the working memory are supplied via an address switching multiplexer which is itself fed from an address bus associated with the central processing unit via a plurality of address pointer registers, of which at least a portion is arranged in serial queues, the number of these queues being at least equal to $v+1$ corresponding to the number $v$ of variable operands increased by one queue for the address of an operation result to be written into working memory.

In the above, the expression "operand of parameter type" has been used to denote a fragment or word in working format (for example in 8 bits) which is extracted from an operand datum of much bigger format, and which parameter is used without change, during several successive elementary operations forming a sequence of operations, but is able to assume a different value during a different sequence. The expression "variable operand" similarly means a fragment in working format which is extracted from an operand datum having a much bigger format, but the position of the fragment in the complete operand datum (and therefore the value of the extracted word) successively varies during a sequence of operations.

The microcontroller according to the invention has the advantage that the specialized processing module has access to the working memory without interrupting the functioning of the central processing unit during a series of operations forming a sequence, and that during this time period, the central processing unit is free to perform other complementary tasks, and more particularly to modify the content of the address pointer registers located upstream of the queues for the purposes of data to be processed during the next sequence. The processing module itself uses the pointer registers located downstream of the queues, these registers being incremented (or decremented) automatically by the sequencer during a sequence of operations.

This advantage is equivalent to a very significant saving in time given that the time taken for the central processing unit to load an address pointer is in the order of eight times longer than the corresponding to an operation of the processing module.

According to a preferred embodiment of the invention, the microcontroller is characterized in that the local bus feeds the processing module via a plurality of data registers, at least a portion of which is arranged as second serial queues, the number of these second queues being at least equal to v.

The address of the variable operands being supplied by the pointer registers downstream of the queues, it is advantageous to place the variable operands data in queues in such a way as to be able to perform the simultaneous transfers within the data queues in a single period of the clock which clocks the processing module.

A particularly advantageous embodiment of the invention which applies in the case in which the number k of operands of parameter type is greater than 1, is characterized in that the sequencer and the processing module comprise means of sequencing in repetitive elementary cycles and means of storage, capable of ensuring that each of the k operands of parameter type are successively used by the processing module during an elementary processing cycle having k steps, there being only one result datum to be written in the working memory during this elementary cycle.

In this embodiment, a sequence of operations is now broken down into a series of elementary successive cycles during which several fragments or words taken from a complete operand are taken into account cyclically, for example the operands pi, pj, pk; pi, pj, pk; pi ... etc., the indices i to k representing the rank of the word in the complete operand datum. The sequence of operations using pi, pj, and pk defines an elementary sequence of operations using a set of variable operands. Other variable operands are used in the next elementary cycle and so on until all variable operands have been used. The totality of these elementary successive cycles therefore forms what has previously been called a sequence of operations.

As will be explained in detail below, this arrangement enables a considerable speeding up of the processing procedure and is advantageously associated with means of initialization capable of performing, at the start of each series of elementary cycles, a special initialization cycle during which the processing module loads the data registers with the k operands of parameter type from an address pointer register, which can be incremented by the processing module.

Thus, when a number k of operands of parameter type is chosen such that k−1=v (v being the number of variable operands), the local bus can be used without interruption during a sequence of operations: the processing module carries out one basic operation in each step, during which the va variable operands are successively reloaded, and then a result datum is written. The complete process forms an elementary cycle of operations. The functioning of the processing module is therefore optimum and does not contain any stoppage time during a sequence formed of a series of elementary cycles of operations. Furthermore no stoppage time occurs before the start of the next sequence when the central processing unit has made use of the time necessary for independently reloading the address pointers relating to this next sequence.

Other particular embodiments of the invention, details and advantages will be revealed in the following description referring to the drawings, all given by way of non-limitative example.

DESCRIPTION OF PREFERRED EMBODIMENTS

Figure 1:
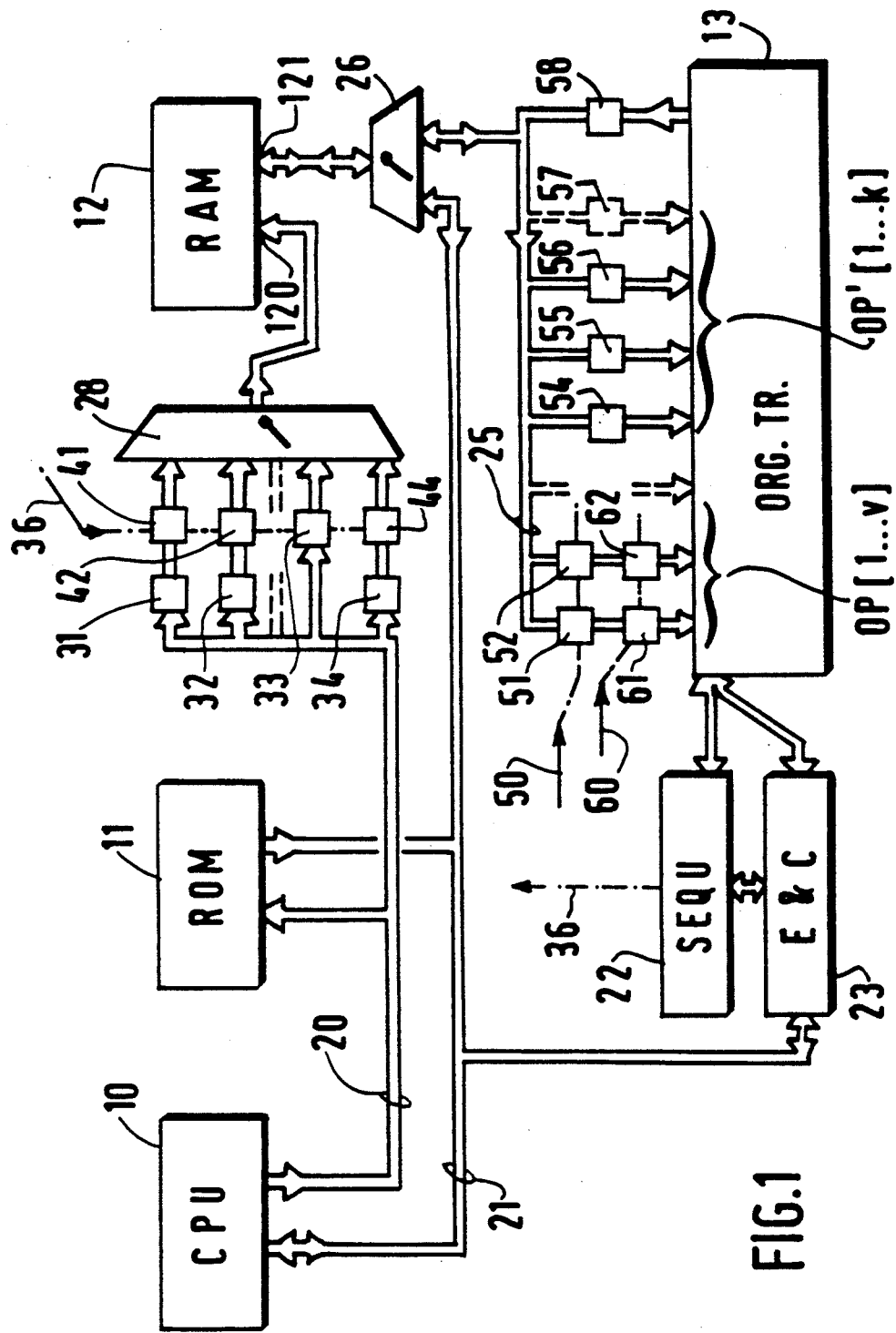
FIG. 1 is a block diagram of the general structure of a microcontroller according to the invention.

The general structure of a microcontroller according to a first embodiment of the invention is shown in FIG. 1. This microcontroller has a central processing unit (CPU) 10 for the management and execution of a data processing program, a set of memories including at least one program memory (ROM) 11 for storing a program to be executed by the central processing unit 10, and at least one working memory (RAM) 12 of the read and write type, for storing the data to be processed and the successive results produced by the processing procedure. The working memory 12 is provided with an address port 120 and a data port 121.

The microcontroller also comprises a specialized processing module 13 for performing sequences of operations on a plurality of operands OP[1 ... v] and OP'[1 ... k] applied to its inputs, a sequencer 22 associated with the processing module 13 for determining the running of the sequences of operations, and a "status and controls" registers unit 23 associated with the processing module 13.

The central processing unit 10 communicates by means of an arrangement of internal buses with the principal elements of the microcontroller. In FIG. 1 an address bus 20 and a data bus 21 have been shown. The control bus has not been shown for reasons of clarity of the figure.

The microcontroller according to the invention furthermore comprises, in addition to the data bus 21 which is associated with the central processing unit, a local bus 25 which is reserved for the transfer of data between the processing module 13 and the data port 121 of the working memory 12. The local bus 25 and the data bus 21 can separately access the said port 121 of the working memory 12 via a data switching multiplexer 26. The address port 120 of the working memory 12 is connected to the output of an address switching multiplexer 28 whose inputs communicate with the address bus 20 via a plurality of address pointer registers 31-34, 41-44. At least a portion of these address pointer registers is arranged as serial queues such as the queues 31, 41; 32, 42.

The operands OP [1 ... v] and OP'[1 ... k] represent extracts of reduced format (words of 8 or 16 bits for example) of large format operand data, given that a microcontroller can, at a given instant, being intended to rapidly process a large number of operations which can be broken down into successive elementary operations of the same kind, and each series of elementary operations forming what has been called a sequence of operations, it is usually possible to organize the processing to be performed in cycles of elementary operations during which one or more operands OP[1 . . . v] assumes a specific value which is different in each step of the processing while one or more operands OP'[1 . . . k] retain the same values during a particular sequence. This is the case in particular in the multiplication of two large numbers which can be considered as a series of multiplications between operands of the multiplicand, called variables since they are taken successively in each computing step, by an operand of the multiplier, the latter being maintained constant during this series of operations and called an operand of parameter type for this reason. In the microcontroller according to the invention it is provided that the number of address pointer queues 31, 41; 32, 42; . . . is at least equal to v+1, v corresponding to the number of variable operands to which one queue 34, 44 is added which is intended to point to the address of the result of each cycle of operations. It is then possible to make the central processing unit 10 load the address of the start of the variable operands and the address of the start of the results to be written in preparation for the next processing sequence, while during the sequence in progress the registers 41, 42 . . . 44 are incremented (or decremented) automatically under the control of the sequencer 22. In the figure, the control of incrementation of the registers 41, 42 . . . 44 has been symbolized by the arrow 36. At the end of a processing sequence, the address values contained in the leading registers 31, 32 and 34 of the queues of address pointers can be transferred into the downstream registers 41, 42 . . . 44 of these queues in a single clock cycle. The waiting time corresponding to the reloading of the pointers 31, 32, 34 by the central processing unit 10 is actually saved since this loading is carried out while the processing module 13 is busy processing the data of a sequence.

The presence of the local bus 25 and of the data switching multiplexer 26 enables the processing module 13 to directly access the working memory 12 while at the same time the central processing unit 10 is free to make use of the data bus 21, for example in order to read data from the program memory 11. This considerably increases the processing efficiency of the microcontroller according to the invention.

According to an advantageous embodiment of the invention, the local bus 25 supplies the processing module 13 via a plurality of data registers 51, 52 . . . 54, 55, 56, 57, 61, 62 . . . of which at least a portion of them is arranged as a serial queue 51, 61; 52, 62; . . . the number of these queues being at least equal to v, (v representing the number of variable operands). In the embodiment shown in the diagram of FIG. 1, the data register 58 is reserved for the storage of a partial result coming from the processing module 13. While the local bus 25 is used for the transfer of this result from the register 58 to the working memory 12, new variable operands OP[1 . . . v] can be transferred to the queues 51, 61; 52, 62; . . . for the purpose of using these new operands in the next operation. If it is necessary to vary the variable operands OP[1 . . . v] in each processing step of the processing module 13 it will then be necessary to use v cycle times of the local bus 25 in order to reload the v data registers 51, 52 . . . in addition to the one clock cycle time reserved for the writing of the result.

It should be observed that most of the time it is possible to organize the data processing work in such a way as to have only a single result datum to be stored in the working memory following several elementary processing steps. This is the case in particular of the typical example of the multiplication of two large numbers, a case in which intermediate results can be immediately recycled in the next processing step. Various practical applications allow this type of processing.

In a particularly advantageous embodiment the microcontroller uses a number k of operands of parameter type which is greater than 1, the sequencer 22 comprises means of sequencing in repetitive elementary cycles and the processing module 13 comprises switching means which are capable of ensuring that each of the k operands of parameter type is used successively by the processing module 13 during an elementary processing cycle of k steps, there being only one result datum to be written in the working memory 12 during this elementary cycle.

The functional details can be explained now with reference to a first example in which it assumed that v=2 and k=3. The data registers 54, 55, 56 are used for the storage of the operands of parameter type OP'[1], OP'[2], OP'[3]. The data stored in these registers are successively used during an elementary processing cycle having a duration of three elementary steps or clock cycles. During this three-step elementary cycle, there is a successive performance of the operations consisting in combining OP'[1] with the variable operands OP[1] and OP[2], and then, in the next step, the combination of the operand OP'[2] with the variable operands OP[1] and OP[2] and then, finally, the combination of the operand OP'[3] with the variable operands OP[1] and OP[2]. In the next elementary cycle the variable operands OP[1] and OP[2] will be renewed while the operands of parameter type OP'[1, 2, 3] are maintained during the sequence of elementary cycles. It is possible to use the local bus 25 in each step, i.e. two steps for the reloading of the data registers 51 and 52 and one step for loading the result datum from data register 58 into the working memory 12. During these three elementary processing steps, three different processings have been executed and the intermediate results of two processing operations have been recycled within the processing module 13 by appropriate means which will be explained later.

In this example it is clear that the loading of the two operands in the two data registers 51 and 52, located upstream of the queues, can be carried out from address pointer registers, situated downstream of the queues 41 and 42, and incremented or decremented automatically, while the address of the result in working memory 12 is obtained from a pointer register 44 situated downstream of the queue 34, 44. The sequencer 22 controls the address switching multiplexer 28 in such a way that it communicates the appropriate address to the address port 120 of the working memory 12 during an elementary operation cycle. Since the processing module 13 carries out one processing at each clock cycle step of the bus 25 it works with maximum efficiency. Other values of v and k can of course be used but the maximum efficiency is always obtained when the numbers k and v are related by $-1=v$.

For the loading of the k operands of parameter type into the registers 54, 55, 56, at the start of each sequence of operations, it is advantageous to have sequencer 22 performing a special initialization cycle during which these k operands are loaded from an address pointer register 33 which can be incremented under the control of the sequencer 22 in such a way as to access, in three clock cycles, these three operands stored in working memory 12 at three consecutive addresses. Since k operands of parameter type to be used during the sequence which will follow are stored in addresses which immediately follow the addresses of the k operands being used, the pointer register 33 requires only one incrementation in order to correctly point to the next address of the operand in question, to be loaded at the start of the next sequence.

Thus, the central processing unit 10 does not have to intervene in order to reload the pointer register 33 as long as all the operands OP'[1 ... k] stored in the working memory 12 have not been used.

An advantageous second embodiment of the invention will be illustrated as follows. The number k of operands of parameter type is increased to 4 while the number v of variable operands is kept at 2. in FIG. 1 there has been shown in dotted line an additional data register 57 which is necessary in this case. The microcontroller is therefore arranged in such a way as to allow an elementary processing cycle of four steps performing four processing operations during which the local bus 25 is busy during two cycle times for the reloading into the registers 51 and 52 of the two variable operands and one cycle time for the writing in the working memory 12 of the result contained in the register 58. As the elementary operations cycle is a four-step cycle, there is one clock cycle time during which the local bus is not busy. It may however be advantageous, in certain applications, to provide a microcontroller capable of carrying out processings on six operands (two variable operands and four operands of parameter type) during certain processing sequences, while during other sequences the number of operands used is reduced to 5 (two variable operands and three operands of parameter type), a case in which the functioning is therefore optimum as has been seen previously. According to this variant embodiment, the "status and controls" registers unit 23 and the sequencer 22 are provided with sequencing control means enabling the processing module 13 to be made to function during a series of successive elementary cycles either with four operands of parameter type and one four-step elementary cycle or with three operands of parameter type and a three-step elementary cycle, all under the control of the central processing unit 10.

More generally, the microcontroller according to the invention is arranged such that it accepts a number k of operands of parameter type such that $k-1>v$ and such that it comprises control means enabling functioning either in elementary cycles with k steps, or with p operands of parameter type and an elementary cycle of p steps, the number p being less than k and at least equal to $v+1$.

For the clarity of the explanations, it has been up to now indicated that the loading of the addresses values in the address pointer registers 31–34 is effected by the central processing unit 10 by means of the address bus 20. In practice however, it can be advantageous that the address values are transmitted to said registers 31–34 using the data bus 21 as a transmission channel, instead of the address bus 20. According to this variant embodiment, not shown in FIG. 1, it will suffice to connect the whole address pointer registers 31–41 to the data bus 21 and to provide a further access possibility through the address bus 21, but to only one of the registers 31 or 32 or 34. This further access is then selected by means of a further multiplexer (not shown) and reserved for an ordinary READ or WRITE operation in the working memory 12, by the central processing unit 10''.

An example of the processing module 13 will now be described with reference to FIG. 2. Such a processing module is described in copending French application 8917456 to Applicant, filed Dec. 29, 1989, corresponding to a commonly owned U.S. patent application filed concurrently with this application under the title: "Arithmetic processing module to be associated with a microprocessor central processing unit". The processing module 13 comprises the inputs 71 and 72 communicating with the data registers 61 and 62 where the variable operands OP[1] and OP[2] have been stored and the inputs 74, 75, 76 and 77 communicating with the data registers 54, 55, 56, 57 (FIG. 1) where the operands OP'[1], OP'[2]... OP'[4] have been stored. The inputs 74 to 77 are applied to a multiplexer 80 for selecting one of the operands of parameter type OP'[1 ... k] at an instant of the processing, under the control of the sequencer 22, this control being symbolized by the control input 81 and the dotted and dashed lines 82. A double control (dashed and dotted lines 82') is used in FIG. 2 to symbolize the fact that the multiplexer 80 is controlled by the sequencer depending on whether the elementary cycle is performed on three operands or on four operands.

Figure 2:
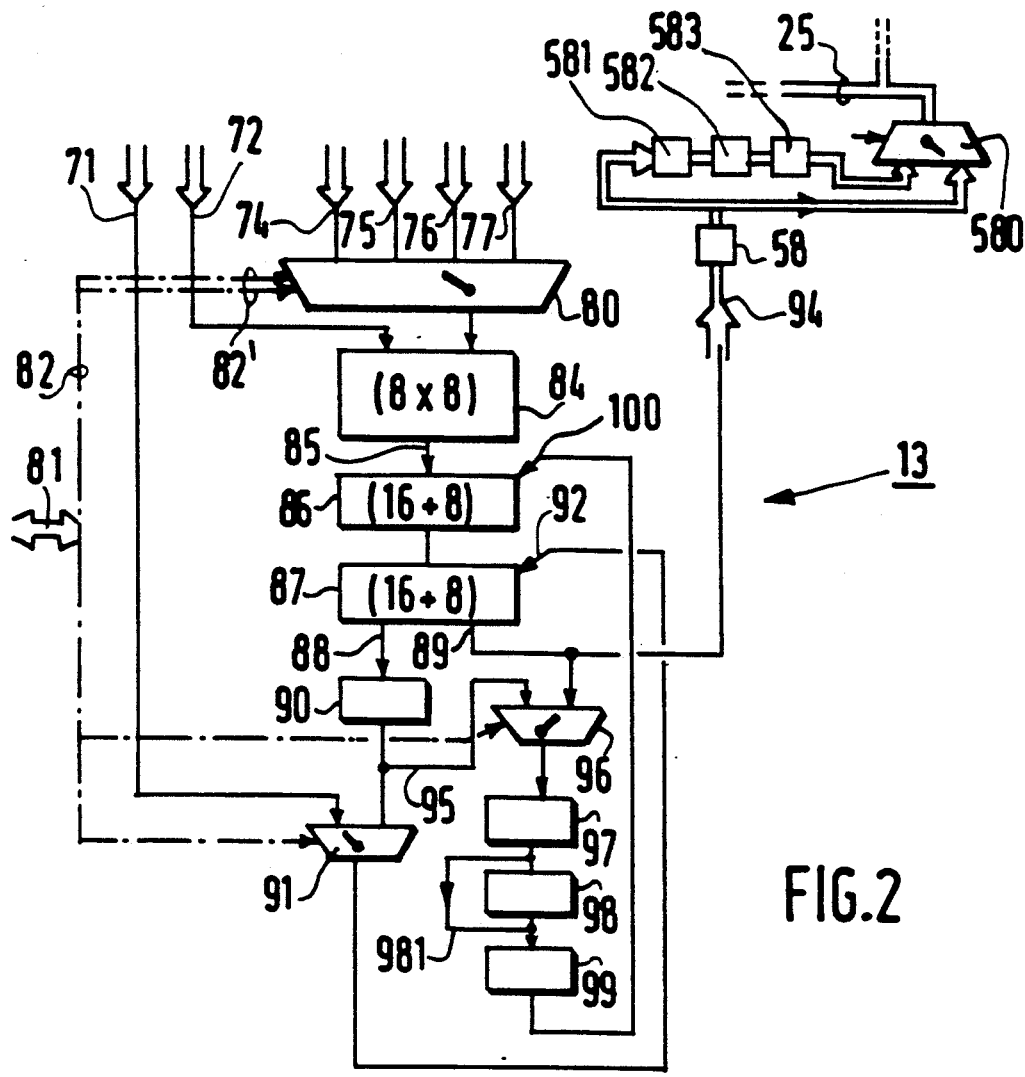
FIG. 2 is a block diagram of a portion of the microcontroller of FIG. 1 and a variant connection of this portion to the general structure.

In the example shown in FIG. 2, the processing module 13 has been designed to perform a computation corresponding to the general formula:

$$B = aX + A$$

in which:

B has many bits and corresponds to a result, most ofetn, an intermediate result, whose successive partial values are stored successively in the working memory 12 via the register 58, X is a multibit number whose successive extracts are applied to the data inputs 72, A is a multibit number whose successive extracts are applied to the data input 71, and a is an operand of parameter type whose extracts OP'[1 ... k] are applied to the inputs 74 to 77.

In order to perform this type of operation, the processing module essentially comprises an 8×8 bits multiplier 84 supplying a result in 16 bits at the output 85, followed by a first 16+8 bits adder 86, which is followed by a second 16+8 bits adder 87. The 16 output bits of the second adder 87 are divided into a most significant section output 88, and a least significant section output 89. The section at output 88 is stored in a buffer register 90. This value is normally recycled to the input 92 of the second adder 87 for the next computing step, via a multiplexer 91, when this value has reached the corresponding significance level. However, at each first step of a three-step cycle, the multiplexer 91 is controlled to sample the variable operand available at the input 71 and to transmit it to the input 92 of the second adder 87. It is also during each first cycle step that the section (8 low significance bits) at the output 89 of the second adder 87 is placed in the register 58 via the data output 94, as the result of this cycle of operations. Finally, it is also during each first cycle step that the datum previously stored in the buffer register 90 is transferred, via a multiplexer 96 at the head of a series of buffer registers 97, 98, 99, for its use at the input of the second adder 87, at the appropriate time, i.e. in the last step of the same cycle.

Outside of the first cycle steps, the multiplexer 96 is set in such a way that the register 97 receives the low significance datum at the output 89 of the second adder 87. After this, the data contained in each of the registers 97, 98, 99 are transmitted into the register which follows it in the stack. The datum contained in the register 99 has been used and is eliminated. This provides appropriate recycling of the intermediate computing data to the input 100 of the first adder 86.

It should be noted that if the processing module 13 must work on three operands of parameter type (k=3 and input 74 not used), the correct recycling of intermediate data by means of the stack of registers 97-99 is obtained when one of the registers, for example the register 98, is avoided; which, for simplicity, has been represented symbolically in FIG. 2 by a link 981 even though in reality this effect is obtained by means of a further multiplexer not shown.

As shown in FIG. 2, by dotted and dashed lines, the multiplexers 91 and 96 are activated by the sequencer 22 from the control input 81.

At the end of a processing sequence and when the data of the variable operands applied to the inputs 71 and 72 have been used, zeroes are placed on these inputs, meaning that registers 51 and 52 in FIG. 1 are forced to zero while waiting for the values stored in the buffer registers of the processing module 13 to be recycled and removed in the form of output results 94. It should be noted that the cycles of such "emptying" of the processing module 13 obey the same sequencing law as the other computing cycles working on non-zero operands.

FIG. 2 also shows a variant of the structure of the microcontroller of FIG. 1 aimed at saving memory locations in the working memory 12, and which is used when the data processing includes a sequence for which a certain number of high significance part of the results must be reused during the next sequence as operands of parameter type. For this purpose, the output 94 of the processing module is stored in a data register 58 which is connected to the local bus 25 via a multiplexer 580. The result can also be stacked in buffer registers 581, 582 and 583 which form a queue of (k−1) positions, and the use or non-use of this queue is determined by the multiplexer 580. During a sequence of operations, the successive results are stored in the working memory 12 from the data register 58, and directly via multiplexer 580 to local bus 25. At the end of the sequence, the most significant last four words of the result are also stored in the registers 58, 581, 582 and 583. Before the start of the next sequence of operations, the multiplexer 580 is then switched to receive the output of the queue and the last four result data can be transferred via the local bus 25, successively, into the data registers 54, 55, 56, 57 of FIG. 1 without intervention by the central processing unit 10.

In certain applications, it is not necessary to store the four most significant result words in question in the working memory 12, so the sequence is interrupted four cycles previously, and the working memory can be reduced by four bytes. Thus, the number of cycles to be performed and the operating mode of the processing module 13 are determined by the sequencer 22 from a control word loaded by the central processing unit 10 into a control register which is part of the "status and controls" registers unit 23 which will now be described.

Figure 3:
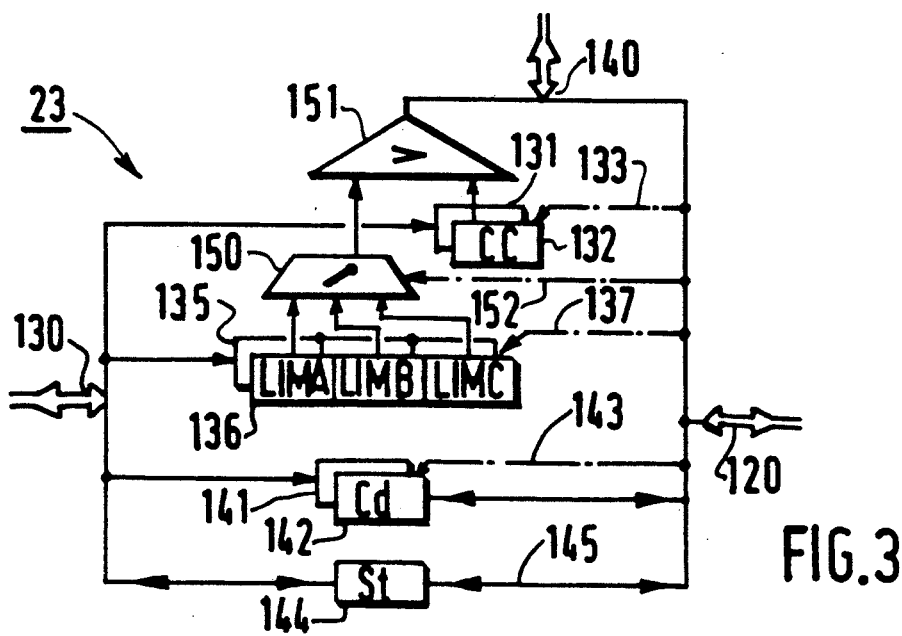
FIG. 3 shows detail of another portion of the microcontroller according to the invention.

FIG. 3 shows a block diagram of an embodiment of a status and controls registers unit 23 in FIG. 1. The link with the data bus 21 has reference 130. This link enables the central processing unit 10 to load a cycles counting upstream register 131 which has an image register 132 that is loaded with the content of the register 131 and then decremented under the control of the sequencer 22. The control of transfer and decrementation is symbolized by the dotted and dashed line 133 which is part of the link to the said sequencer symbolized in the figure by the reference 140. The central processing unit 10 can then load, through the link 130, three limit registers 135, whose content can be transferred into image registers 136 (referenced LIM A, LIM B and LIM C). The transfer from the limit registers 135 into the image registers 136 is controlled by lines 137 and 140. The status and controls registers unit 23 furthermore comprises a control register 141 and its image register 142, the transfer of the content being controlled by the sequencer 22 and symbolized by the link 143, and a status register 144 connected to the bus 21 by the link 130 and to the processing module 13 by the link 145.

The content of the cycles counter register 132 is compared with one of the limits LIM A, LIM B or LIM C by means of a comparator 151, via a multiplexer 150 selecting, by means of the control 152, the type of limit to be monitored. Therefore comparator 151 controls the operating mode of the processing module 13 in order to execute a determined sequence. The double control register 141, 142, contains the data controlling the functioning of the processing module 13, for example, one bit for initiating the processing module 13, one bit for indicating which of the functioning modes must be used (the number of operands of parameter type to be used), one bit indicating whether the operands of parameter type must be loaded from the working memory 12 or from the queue of registers 58, 581, 582, 583 for result. The status register 144 completes the control register 142 which has, for example, one bit to indicate that the processing module has completed a series of operation cycles, one bit for the presence of a carry within the results being processed by the processing module 13 and possibly bits reserved for the control of deactivation of the reading or writing of certain operands and the zero resetting of these operands in the corresponding data registers.

Figure 4:
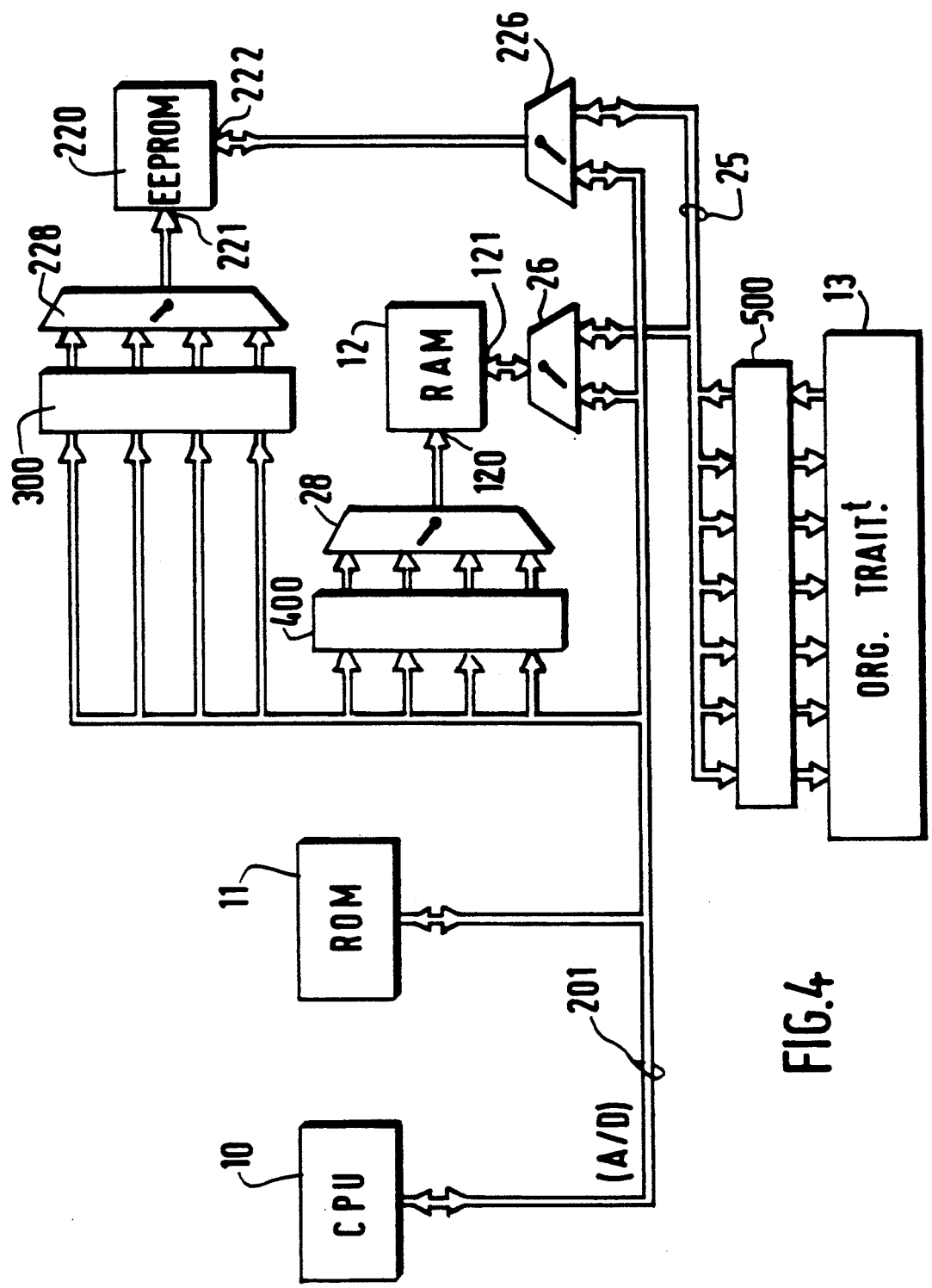
FIG. 4 shows the structure of microcontroller according to a variant embodiment of the invention.

FIG. 4 is a diagram of another embodiment of the microcontroller according to the invention. In this figure, the elements corresponding to the elements in FIG. 1 are indicated with the same reference signs. For reasons of clarity, the sequencer and the status and controls registers unit have not been shown, neither have the control links between the various elements of the microcontroller. The microcontroller of FIG. 4 differs from that shown in FIG. 1 firstly by the fact that the addresses and the data transit from the central processing unit 10 by means of a single bus 201 where the addresses and the data are time-multiplexed. For reasons of clarity in the figure, the set of data registers interposed between the local bus 25 and the processing module 13 has been symbolized by the block 500. These data registers, including queues, can be essentially identical to those previously described with reference to FIG. 1.

The microcontroller of FIG. 4 is also distinguished by the fact that it uses two working memories, a RAM memory 12 and a non-volatile memory, for example an EEPROM, 220. With regard to the RAM memory 12, its address port 120 is connected to the internal bus 201 linked with the central processing unit 10 in the same way as described in FIG. 1, i.e. via an address switching multiplexer 28 and a set of address pointer registers including a certain number of queues, all of these address pointer registers being symbolized by the block 400. The architecture surrounding the EEPROM memory 220 is very similar to that which surrounds the RAM memory 12, i.e. its address port 221 is linked with the bus 201 via address switching multiplexer 228 and a set of address pointer registers 300 also including queues. The set of address pointers 300 is very comparable with the set of address pointers 400 linked with the RAM memory 12. The data port 220 of EEPROM memory 220 can be connected either to the internal bus 201 (linked with the central processing unit 10) or to the local bus 25, via a data switching multiplexer 226. Because the writing in an EEPROM memory is comparatively slow it is preferable to access to this memory only for read operations; these are as fast as the readings carried out in the RAM memory 12.

In particular the description of the processing module 13 with reference to FIG. 2 is specially oriented towards an operation of the type $B = aX + A$. Nevertheless, it is clear that the microcontroller according to the invention has a much more general application, particularly on modifying the composition of the processing module 13 and on optimizing it specifically for the problem of the desired processing. Therefore, it will be possible to provide other modes and embodiments without departing from the scope of the invention.

We claim:

1. Integrated microcontroller for the rapid execution of a large number of operations which can be broken down into successive sequences of operations of the same kind, comprising:

a central processing unit (CPU) for the management and execution of a data processing program;

a set of memories comprising at least one program memory for the storage of a program to be executed by the central processing unit, and at least one working memory of the read and write type, for the storage of data to be processed and of the successive results produced by a processing procedure, this working memory being provided with address port means and data port means;

a specialized processing module for executing said sequences of operations on a plurality of operands applied to its inputs, these operands comprising v variable operands and k parameter operands which are maintained constant during a particular sequence of operations;

a sequencer coupled with the specialized processing module for controlling its running of a sequence of operations;

a status and controls registers unit coupled with the specialized processing module and with the sequencer, and an internal address and data bus arrangement coupling said central processing unit, set of memories, specialized processing module and status and controls register unit;

wherein the bus arrangement comprises: a first data bus means coupled with the central processing unit; a specialized local bus coupled with the specialized processing module; a data multiplexer means coupled between said first data bus means, said specialized local bus and a data port means of the working memory in a manner that the said local bus and the first data bus means each access said data port means of the working memory via said data switching multiplexer, and an address bus means coupled with the central processing unit; a plurality of address pointer registers fed by the address bus means; an address switching multiplexer means fed by said plurality of address pointer registers; at least a portion of said address pointer registers being arranged in first serial queues, the number of these first queues being at least equal to $v+1$ corresponding to the number v of variable operands increased by one queue for the address of an operation result to be written into said working memory.

2. Microcontroller according to claim 1, further comprising a plurality of input data registers via which the local bus feeds the processing module, at least one of said input data registers being arranged as second serial queues, the number of these second queues being at least equal to v.

3. Microcontroller according to claim 2 in which the number of operands of parameter type is $k > 1$, wherein said sequencer controls said specialized processing module such that said specialized processing module comprises means for sequencing in repetitive elementary cycles in a manner that each of the k operands of parameter type are used successively by the specialized processing module during an elementary processing cycle of k steps, there being only one result datum to be written into the working memory during this elementary cycle.

4. Microcontroller according to claim 3, characterized in that said specialized processing module comprises means for performing, at the start of each sequence of operations, a special initialization cycle during which the processing module loads the input data registers with the k operands of parameter type from an address pointer register which is automatically incremented.

5. Microcontroller according to claim 4, wherein the number k of operands of parameter type is such that $k - 1 = v$, v being the number of variable operands.

6. Microcontroller according to claim 5, further comprising an output data register in series with a third serial queue of output data registers coupling a result data output of said specialized processing module to the local bus, the number of delay positions in said third serial queue being equal to $k - 1$, and switching means controlled by the sequencer for avoiding said third serial queue.

7. Microcontroller according to claim 4, wherein said specialized processing module is arranged to accept a number k of operands of parameter type such that $k - 1 > v$ and in that said sequences controls said specialized processing module in a manner enabling the specialized processing module to be made to function during a processing sequence and under the control of the central processing unit, either with k operands of parameter type and an elementary cycle of k steps, or with p operands of parameter type and an elementary cycle of p steps, the number p being less than k and at least equal to $v + 1$.

8. Microcontroller according to claim 7, further comprising an output data register in series with a third serial queue of output data registers coupling a result data output of said specialized processing module to the local bus, the number of delay positions in said third serial queue being equal to k−1, and switching means controlled by the sequencer for avoiding said third serial queue.

9. Microcontroller according to claim 4, further comprising an output data register in series with a third serial queue of output data registers coupling a result data output of said specialized processing module to the local bus, the number of delay positions in said third serial queue being equal to k−1, and switching means controlled by the sequencer for avoiding said third serial queue.

10. Microcontroller according to claim 3, wherein the number k of operands of parameter type is such that k−1=v, v being the number of variable operands.

11. Microcontroller according to claim 3, wherein said specialized processing module is arranged to accept a number k of operands of parameter type such that k−1>v and in that said sequencer controls said specialized processing module in a manner enabling the specialized processing module to be made to function during a processing sequence and under the control of the central processing unit, either with k operands of parameter type and an elementary cycle of k steps, or with p operands of parameter type and an elementary cycle of p steps, the number p being less than k and at least equal t v+1.

12. Microcontroller according to claim 3, further comprising an output data register in series with a third serial queue of output data registers coupling a result data output of said specialized processing module to the local bus, the number of delay positions in said third serial queue being equal to k−1, and switching means controlled by the sequencer for avoiding said third serial queue.

13. Microcontroller according to claim 12, wherein the specialized processing module comprises means for performing, at the start of a sequence of operations, a special initialization cycle during which the processing module loads the input data registers with the k operands of parameter type from the third serial queue of output data registers via the local bus.

14. Microcontroller according to claim 1, wherein said first data bus means and said address bus means are comprised by a single multiplexed bus via which the program memory, the address multiplexer and the data multiplexer exchange addresses and data.

15. Microcontroller according to claim 1, characterized in that said address bus means and said first data bus are configured to convey addresses and data, respectively, in a single 8-bit format.

16. Microcontroller according to claim 1, wherein the working memory comprises a pair of memory sections, namely a section of RAM-type memory and another section of non-volatile type and said data port multiplexer means comprises a pair of data multiplexers coupled to said first data bus means and to said local bus and coupled respectively to data ports of these memory sections in a manner that said data ports can separately be put into communication either with the first data bus means or with the local bus; said plurality of address pointer registers comprises a pair of groups of address pointer registers, one group for said RAM-type memory section and one group for said non-volatile memory sections and said address multiplexer means comprises a pair of address multiplexers respectively coupled between said groups of addresses pointer registers and address ports of said pair of memory sections, each group comprising a number of said first queues at least equal to v+1.

* * * * *